April 2, 1968 J. A. BRIGHT ET AL 3,375,677

METHOD AND APPARATUS FOR MAINTAINING HIGH HUMIDITY IN A FROST-FREE DOMESTIC REFRIGERATOR

Filed Jan. 3, 1967 4 Sheets-Sheet 1

INVENTORS
James A. Bright &
John J. O'Connell

BY J. C. Evans
ATTORNEY

METHOD AND APPARATUS FOR MAINTAINING HIGH HUMIDITY IN A FROST-FREE DOMESTIC REFRIGERATOR

Filed Jan. 3, 1967

INVENTORS
James A. Bright &
John J. O'Connell

BY J.C. Evans
ATTORNEY

April 2, 1968 J. A. BRIGHT ET AL 3,375,677
METHOD AND APPARATUS FOR MAINTAINING HIGH HUMIDITY
IN A FROST-FREE DOMESTIC REFRIGERATOR
Filed Jan. 3, 1967 4 Sheets-Sheet 3

INVENTORS
James A. Bright &
John J. O'Connell
BY J. C. Evans
ATTORNEY

INVENTORS
James A. Bright &
John J. O'Connell
BY J. C. Evans
ATTORNEY

United States Patent Office 3,375,677

Patented Apr. 2, 1968

3,375,677

METHOD AND APPARATUS FOR MAINTAINING HIGH HUMIDITY IN A FROST-FREE DOMESTIC REFRIGERATOR

James A. Bright, Miamisburg, and John J. O'Connell, Dayton, Ohio, assignors to General Motors Corporation, Detroit, Mich., a corporation of Delaware

Filed Jan. 3, 1967, Ser. No. 606,999

8 Claims. (Cl. 62—89)

ABSTRACT OF THE DISCLOSURE

In preferred form, a plural compartment domestic refrigerator including a lower freezer and an upper food compartment divided into two sections by a glass shelf or divider. An upper door closing the refrigerator compartment has a cushion vinyl seal engaging the glass shelf or divider to seal between the sections. One of the separated sections has enclosed ducts located on the back and sides thereof through which cold air circulates without flowing through the compartment. High humidity is maintained in this section by sealing it from the rest of the refrigerator. A part of the cooling air is directed through the other section of the food compartment and cools it by direct convective air flow.

This invention relates to frost-free domestic refrigerators utilizing a forced air circulating system for cooling food storage spaces and more particularly to a process and apparatus for air cooling a food storage compartment in a frost-free domestic refrigerator without directing a forced draft therethrough to maintain high humidity in the compartment while retaining frost-free conditions therein and reduced moisture condensation on horizontal surfaces within the compartment.

In refrigerating apparatus and especially in domestic refrigerators, the concept of maintaining food storage compartments frost-free has gained wide acceptance. Frost-free domestic refrigerators typically include a closed circuit duct system in which dry, cold air is circulated at a predetermined flow rate. The dry, cold air is directed interiorly of food storage compartments in the refrigerator for removing heat therefrom and is returned to a cold source for removing heat from the forced air draft. Moisture picked-up by the circulated air is removed therefrom to prevent a frost build-up within the refrigerator compartment.

While such domestic refrigerators are able to maintain desired refrigerating temperatures in the cooled food storage compartments therein, the circulation of cold-dry air through the compartments can undesirably dehydrate articles within the cooled compartment unless the articles are stored in a relatively air-tight container or otherwise isolated from direct contact with the circulating air stream.

Accordingly, an object of the present invention is to provide a domestic refrigerator cooled by a forced draft cold, dry air stream including a special high humidity section in which uncovered fresh foods and leftovers can be stored for periods of a week or more with negligible loss of appearance and food value.

A further object of the present invention is to provide a domestic refrigerator cooled by a circulating cold, dry air stream wherein the refrigerator includes a food compartment section with enclosed ducts located on the back and sides thereof and wherein cold, dry air from a cold source is directed into the enclosed ducts at the top of the compartment and is divided into separate streams each flowing to the duct at one of the sides and wherein metering means are included to divert a proportionate part of the air stream from the top to the bottom of the back of the compartment whereby the compartment side and rear walls are maintained substantially at a uniform temperature throughout the planar extent thereof.

Another object of the present invention is to improve frost-free domestic refrigeration in a closed refrigerator compartment by a cooling method comprising progressively passing dry, cold air at a predetermined flow rate across the outer surface of an inner liner of the closed compartment starting at the top of the liner and terminating at the bottom thereof and maintaining predetermined planar extents of the liner uncooled to produce a predetermined low velocity natural convection flow within the compartment and a predetermined radiation of heat to the cooled inner liner walls of the compartment to reduce the temperature within the compartment without an undesirable forced draft dehydration of articles therein and/or dehydration produced by moisture removal in the compartment and by frost deposition on the cooled portions of the compartment liner.

Still another object of the present invention is to provide a process and apparatus for maintaining high humidity conditions in a domestic frost-free refrigerator including a food storage compartment having a back and spaced apart side walls including the step of and means for forcing a cold, dry air stream at a predetermined flow rate against the upper end of the side walls and back of the compartment without flowing the air through the compartment, dividing the air stream into two parts for top to bottom flow across the side walls of the compartment and metering a reduced amount of the divided flow streams for top to bottom flow across the back of the compartment to produce substantially uniform cooling of the sides and rear walls of the compartment.

Still another object of the present invention is to prevent forced draft dehydration in a frost-free domestic refrigerator by the provision therein of a sealed high humidity compartment including a liner having a predetermined planar extent, a closed forced air circuit for cooling a part of the compartment liner including means for producing a subfreezing air stream having a predetermined flow rate, said circuit including first duct means for thermally insulating the subfreezing air stream from direct convective heat transfer with the compartment liner to prevent cooling of the liner below freezing as the subfreezing air passes through that part of the closed system and wherein the system includes second duct means for passing the air stream into direct convective heat transfer relationship with the liner walls following tempering of the subfreezing air stream in the first duct means to a point at which the circulated air stream will not reduce the temperature of the liner below freezing as it flows into direct contact therewith.

Another object of the present invention is to improve domestic frost-free refrigerators by a process for cooling a plural compartment therein including the steps of producing a cold, dry air stream having a predetermined flow rate, circulating the air stream around the outer surface of the sealed high humidity compartment for cooling the walls thereof to cool the compartment without forced draft dehydration therein, dividing the circulating air stream as it flows from the walls of the high humidity compartment through first and second parts, passing one of the parts through a flowing cold compartment separated from the high humidity compartment and by-passing the second divided part exteriorly of the flowing cold compartment.

Still another object of the present invention is to improve refrigerant apparatus of the type set forth in the first mentioned object by the provision therein of variable speed motor driven fan means for circulating cold air at a predetermined rate and phase control means for varying the energization of the variable speed motor including means responsive to the temperature in a refrigerator compartment and operable to vary the power supply to the variable speed motor whereby the fan is rapidly changed from approximately 200 r.p.m. to full speed when warm foods are placed in the refrigerator compartment.

Further objects and advantages of the present invention will be apparent from the following description, reference being had to the accompanying drawings wherein a preferred embodiment of the present invention is clearly shown.

Figure 1:
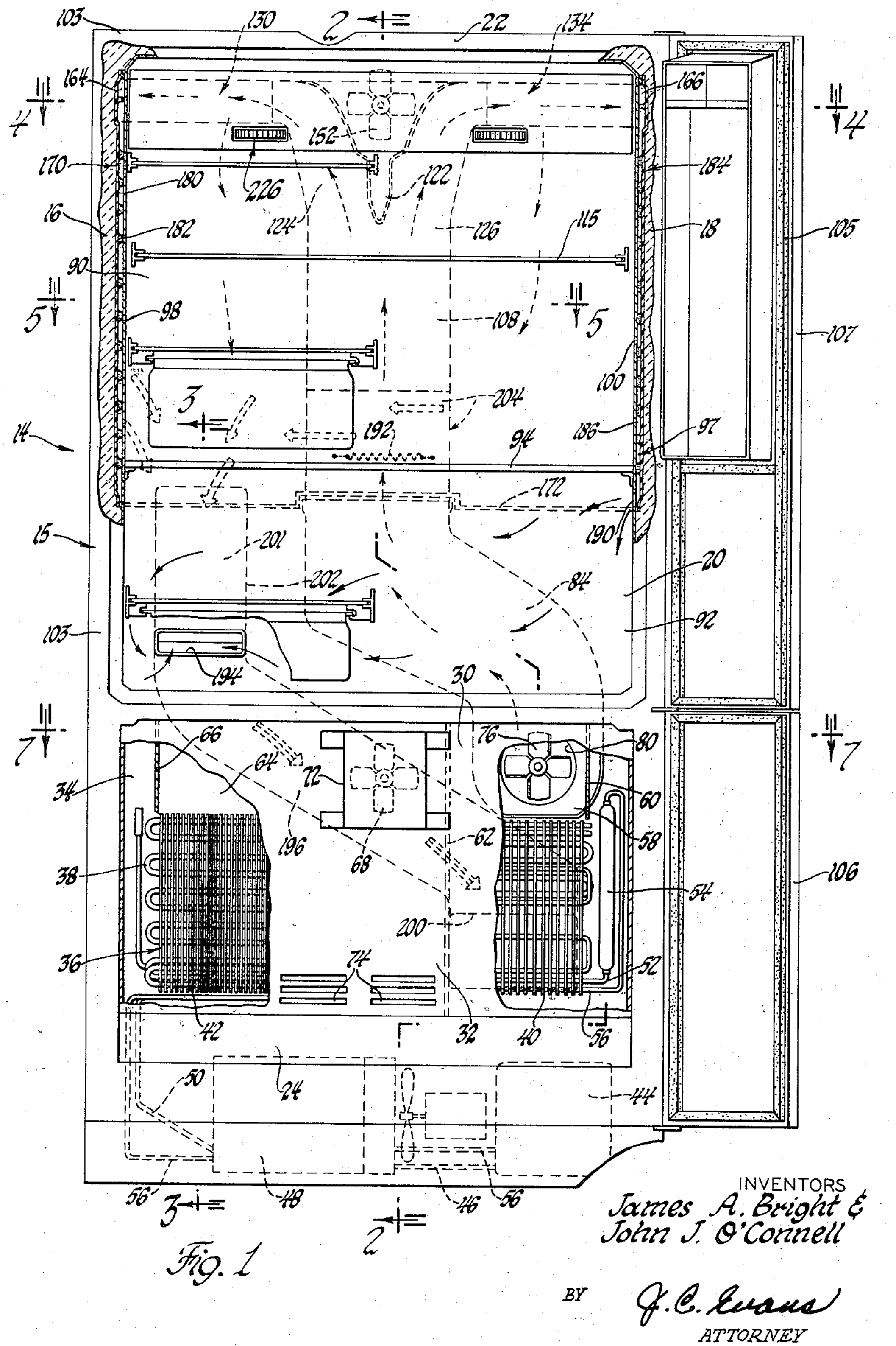
FIGURE 1 is a view in front elevation of a refrigerator, partially broken away including the present invention.

Referring now to FIGURE 1, a plural compartment refrigerator 14 is illustrated including a foam insulated cabinet 15 having side walls 16 and 18, a rear wall 20, and a top 22. Additionally, the refrigerator includes an insulated bottom bulkhead 24 having a peripheral skirt 26 depending therefrom about the bottom of the cabinet 15 to form a machinery compartment 28 within the skirt 26. Above the insulated bottom bulkhead 24 is located a freezer compartment 30 having a partition 32 located rearwardly thereof and extending across the width and height of the freezer compartment 30 so as to define an air cooling space 34 rearwardly of the freezer compartment 30.

Within the air cooling space 34 is located air cooling means representatively shown as a single evaporator 36 having a serpentine formed tube 38 wound through a predetermined portion of the height of the cooling space 34. On one side of the evaporator extending across the wound tube thereof are located a plurality of widely spaced heat exchange fins 40 and across another portion of the evaporator tube extend closely spaced fins 42 each being in heat transfer contact with the serpentine formed tube of the evaporator.

The evaporator 36 is associated with a series flow refrigerant system including a hermetically sealed motor compressor unit 44 operable to discharge refrigerant under pressure to a discharge conduit 46 through a refrigerant condensing coil 48 thence through an elongated capillary tube supply conduit 50 connected to the inlet end of the evaporator tube 38 for expanding condensed refrigerant from the condenser coil 48.

The outlet end 52 of the tube 38 is connected to a vertically oriented refrigerant accumulator 54 that is connected to a suction or refrigerant return line 56 connected to the inlet of the hermetically sealed compressor 44 so as to complete the refrigerant circuit. The air cooling space 34 more particularly is divided into a first compartment 58 formed by divider walls 60 and 62 and a second compartment 64 formed by the divider wall 62 and a divider wall 66.

Figure 7:
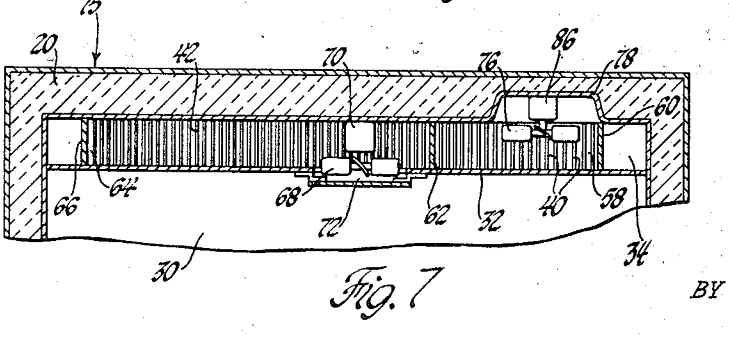
FIGURE 7 is a fragmentary horizontal sectional view taken along the line 7—7 of FIGURE 1.

As best seen in FIGURES 1 and 7, the freezer or below-freezing compartment 30 is cooled by circulating air from a fan 68 driven by a motor 70 to draw air from the compartment 64 in which are located the plurality of closely spaced cooling fins 42. This air is discharged through an outlet 72 from whence cold, dry air is circulated forwardly and downwardly throughout the freezer compartment 30 picking up heat and moisture from the food packages therein thence to be returned through a plurality of return ports 74 in the bottom of the partition 32 back to the compartment 64. In one working embodiment the freezer blower motor 70 cycles with the compressor unit 44 under the control of thermostatically operated control means including means for sensing the temperature within the freezer compartment 30.

Additionally, in the illustrated arrangement, a food compartment fan 76 is located in a fan housing 78 including an inlet 80 to a discharge duct member 82 forming an enclosed fluid flow space 84 through the rear wall 20 above and to one side of the compartment 58 of the cooling space 34. A motor 86 is connected to the fan 76 to operate it to draw air from the compartment 58 of the cooling space 34 in which are located the widely spaced fins 40 of the single evaporator 36. Cooled air from the evaporator 36 is discharged by the fan 76 through the enclosed fluid flow space 84 into a closed duct system 88 associated with an upper food storage compartment including a first above-freezing compartment 90 located at the top of the refrigerator 14 and an intermediately located, above-freezing compartment 92 separated from the upper compartment 90 by a shelf 94 of tempered glass and from the freezer or below-freezing compartment 30 by an insulated divider wall 96. In the preferred form, the refrigerator compartments are sized as follows. Freezer compartment 30 equals 5.9 cubic feet; upper compartment 90 equals 8 cubic feet and intermediate compartment 92 equals 4.7 cubic feet.

The single evaporator arrangement of FIGURE 7 is more specifically described in United States Patent No. 3,252,292, issued May 24, 1966 to O'Connell et al. The refrigerating apparatus disclosed therein is of the frost-free type wherein a closed forced draft air stream is utilized to cool plural compartments by directly flowing the forced draft in two separate air streams through the compartments. Such arrangements have the advantage of removing moisture from the system and depositing it on a cold producing device for preventing the accumulation of frost build-up within the refrigerated compartments and thereafter periodically defrosting the cold producing device and drawing the collected moisture from the refrigerator.

While such frost free refrigerator systems are suitable for their intended purposes, namely for producing reduced temperatures within plural compartments of refrigerating apparatus, it is recognized that certain types of foods are undesirably dehydrated by being directly exposed to a dry cold forced coolant draft of the type present therein. Accordingly, in apparatus of the frost free type, typically, food stuffs must be stored in relatively air tight containers to prevent dehydration and other deterioration in the quality of stored food such as loss of color, odor transfer between stored foods, and certain nutritional losses.

Figure 2:
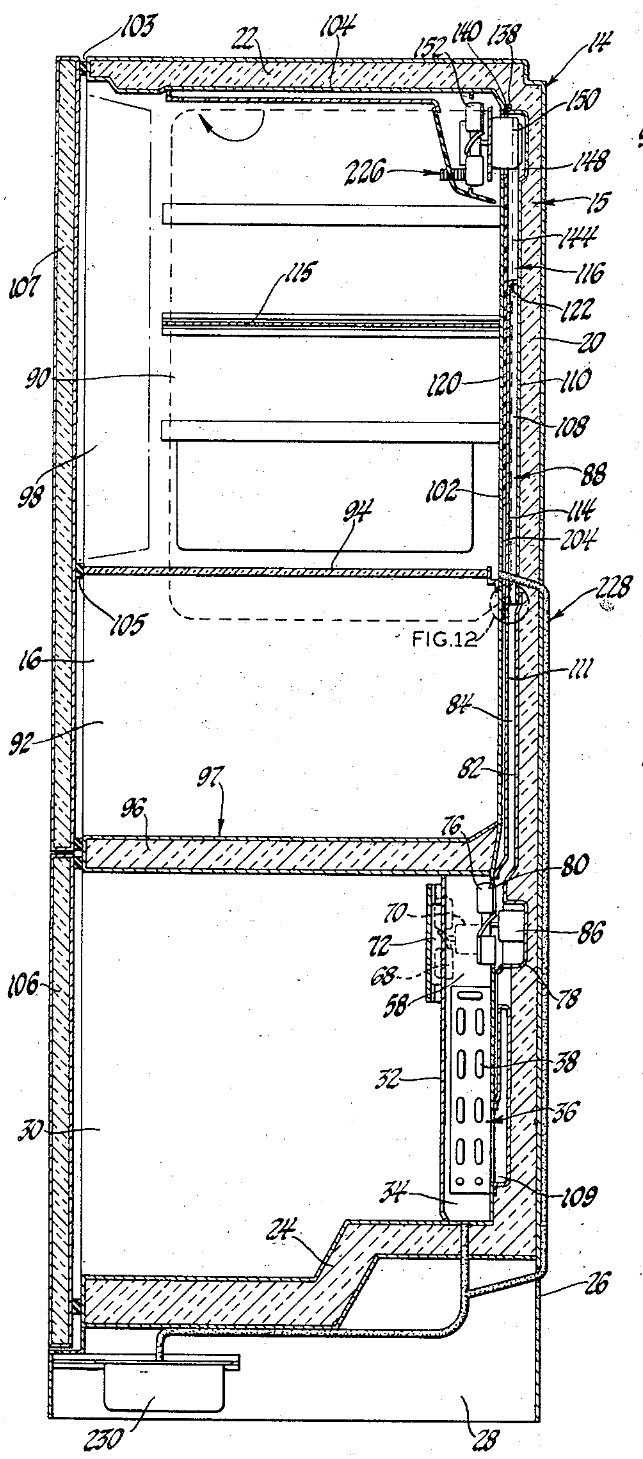
FIGURE 2 is a view in vertical section taken along the line 2—2 of FIGURE 1.

In accordance with certain principles of the present invention, the upper compartment 90 is surounded by a sealed liner 97 of steel coated with an acid resisting porcelain enamel. The liner 97 has good thermal conductivity at its spaced apart side walls 98, 100 and a rear wall 102. The side walls 98, 100 and the rear wall 102 are joined by a top closure member 104 defining the inside under-surface of the top wall 22 of the refrigerator 14. The food compartment 90 is surrounded by a collar 103 that defines an access opening interiorly thereof that is closed by a gasket 105 surrounding the upper portion of a vertically oriented side pivoted door 107. When the door is closed as shown in FIGURE 2, the gasket 105 engages the collar 103 and the divider shelf 94 to completely seal the closure about the compartment space 90. A vertically hinged, peripherally sealed door 106 closes the freezer compartment 30.

In the illustrated embodiment of the invention, the walls 98, 100, 102 are cooled by the closed duct system 88 on the exterior thereof through which air is received from the fluid flow space 84 and from whence cooling air is directed into the intermediate compartment 92 for return through a return duct 109 to the cooling compartment 58 in a manner and through a fluid flow pattern or path which will be more specifically set forth subsequently. The air flowing through the exteriorly located duct systems maintains the vertically oriented walls 98, 100, 102 at a mean temperature just above 32° F. and the interior of the compartment 90 at a refrigerating temperature above freezing and preferably at a range between 34° and 38° F. Cooling inside the compartment takes place by natural convection of air with the liner walls and by radiation of heat to these walls. The air pattern for cooling compartment 90 is primarily shown in dotted arrows in FIGURE 1.

Because the compartment 90 is sealed and has no direct dry-cold air stream passing therethrough. As a result, foods preserved therein retain substantial moisture and any humidity in the surrounding environment will be maintained in compartment 90. The isolation of compartment 90 and 32° F. dew point temperature of the liner 97 causes the humidity level to be substantially above that which is found in frost-free refrigerator compartments of the type set forth in the above mentioned O'Connell et al. patent. It has been found that the presence of an increased humidity within the seal compartment 90 will eliminate dehydration and other food deterioration problems of the type set forth above.

Furthermore, in addition to eliminating forced draft dehydration problems, the duct system 88 and cold liner 97 are arranged to prevent frost accummulation on the inside surface of the liner wall of compartment 90. Furthermore, the particular means by which the compartment 90 is cooled tends to reduce condensation of moisture within the compartment 90 that can cause undesirable drippage from flat horizontal surfaces therein such as the illustrated shelf 115. In prior high humidity refrigerators there is a tendency for sealed high humidity compartments to have a substantial dripping of moisture from such horizontal disposed shelves and moveover in prior high humidity refrigerators the compartment moisture within the seal compartment is often deposited as a frost accumulation on the cold walls of the refrigerator.

In the refrigerating apparatus of the present invention, these problems are solved by a unique cooling method and apparatus wherein coolant is progressively flowed over a sealed compartment liner in a high humidity refrigerator so that the coolant is first directed against a liner portion surrounding the warmest region of the seal compartment and thereafter passed over portions of the liner surrounding cooler regions so that the liner will have a reduced temperature differential throughout the planar extent thereof to serve as a uniform cooling source for the compartment.

Figure 5:
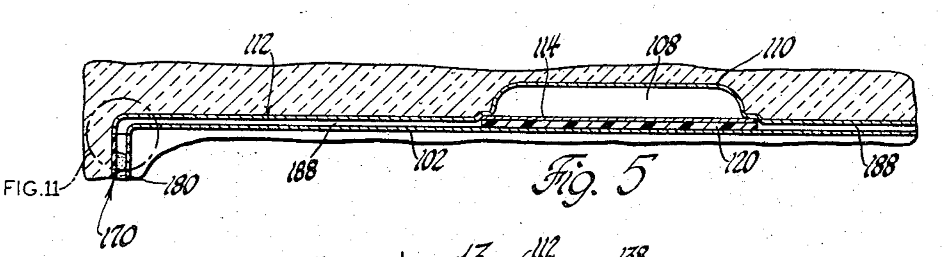
FIGURE 5 is an enlarged fragmentary horizontal section taken along the line 5—5 of FIGURE 1.
Figure 12:
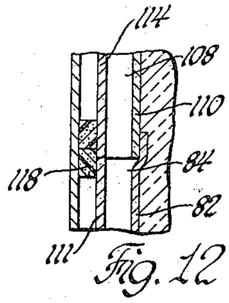
FIGURE 12 is an enlarged fragmentary sectional view of area 12 in FIGURE 2.

Furthermore, the apparatus includes means for preventing an initial cooling of the compartment liner capable of reducing regions thereon below-freezing thereby producing undesirable frost accumulation within the high humidity compartment. To accomplish this purpose in the illustrated arrangement, the apparatus includes the discharge duct member 82 and an inwardly located cover 111 that is spaced from the rear liner wall 102 out of direct heat transfer relationship therewith as seen in FIGURE 2. The duct member 82 and cover 111 form the upwardly directed passageway 84 that merges with a vertically oriented flow passageway 108 formed by a centrally located outwardly bent segment 110 of a rear duct member 112 as best seen in FIGURES 2 and 5, and a depending skirt portion 114 of a flow divider member 116. As is best seen in FIGURE 12, a joint between the skirt 114 and the cover 111 is sealed by a gasket member 118.

Figure 4:
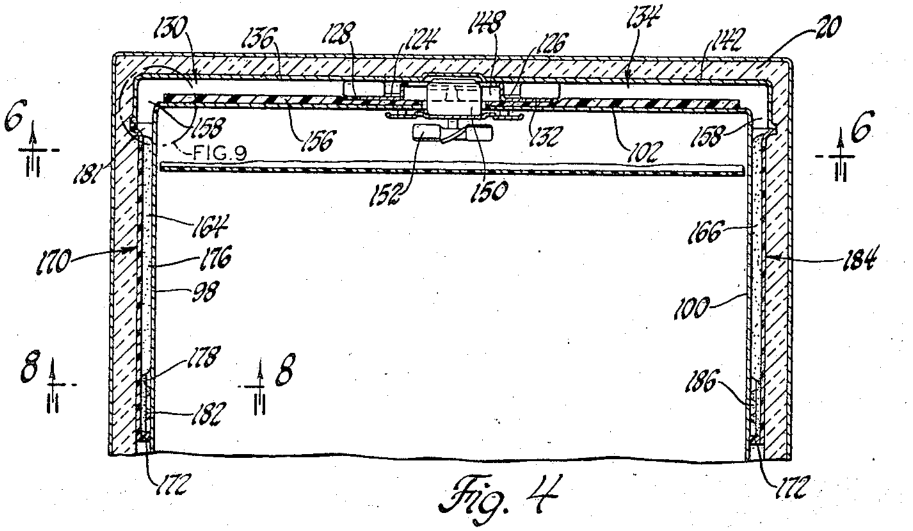
FIGURE 4 is a fragmentary view in horizontal section taken along the line 4—4 of FIGURE 1.

In the compartment 58 at fan 76 the air temperature is in the range of 10–15° F. and as it passes through insulated passageways 84, 108 it may be raised a few degrees but is maintained a number of degrees below freezing. Thus, as passageway 108 extends upwardly across the rear wall 102 centrally thereof as seen in outline in FIGURE 1 it is thermally insulated from the rear wall 102 where it traverses the back of the upper high humidity compartment 90 by a layer of thermal insulating material 120 such as expanded polystyrene. The insulating material 120 is located between the rear wall 102 of the line 97 and the flow dividing member 116 as best seen in FIGURES 2, 4 and 5 to prevent ice formation on the liner 97 until the air has a chance to warm up.

Figure 6:
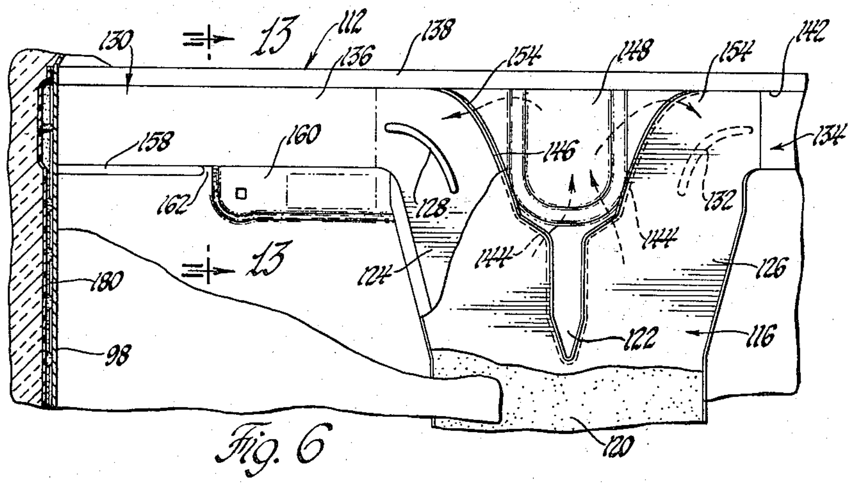
FIGURE 6 is an enlarged fragmentary view in vertical section partly broken away along the line 6—6 of FIGURE 4.

As is best seen in FIGURE 6, the flow divider member 116 includes a depending nose portion 122 that divides the flow passageway 108 into a first branch 124 and a second branch 126. The first branch 124 includes a flow directing vane 128 therein for smoothly diverting approximately half of a predetermined air flow circulating from fan 76 through the inlet passageway 108 into a first plenum space 130 and the branch 126 includes a like flow directing vane 132 for smoothly diverting the remainder of the predetermined air flow passing through the inlet flow passageway 108 into a second air inlet plenum 134.

The plenum space 130 more particularly is formed by an upper portion 136 of the rear duct member 112 deformed outwardly of wall 102 that includes an upper peripheral flange 138 thereon sealed with respect to the upper edge of the rear wall portion 102 of the inner-liner by an elongated upper rear gasket strip 140, as best seen in FIGURE 2.

Also, the opposite side of the rear duct member 112 at the upper end thereof is deformed outwardly of wall 102 at 142 to form the plenum space 134 that is also sealed at the upper edge thereof by the gasket strip 140 at the upper flange 138 of the member 112. The cross-sectional flow area through spaces 130, 134 is reduced to increase the fluid velocity in this region of the cooling circuit thereby to improve thermal transfer from compartment 90 into the cooling stream.

Another feature of the present invention is the provision of a heat source in the inlet air passageway 108 for moderating the temperature of the below freezing air circulating therethrough as it is directed into the plenum spaces 130, 134. More particularly, small bleed passageways 144 are formed in a motor enclosure portion 146 of the member 116 serving to communicate the passageways 124, 126 with a space 148 in surrounding relationship with a motor 150 for driving a humidity control fan 152 located centrally of the high humidity compartment 90 at the top, rear thereof. Air discharged by the fan 76 is forced through the openings 144 in the flow dividing nose 122 thence through the space 148 across the housing of the motor 150 for removing heat therefrom. The warmed air is returned to the divided air streams through ports 154 formed in the flow divider on either side thereof and in communication with the flow passageways 124, 126 where they discharge into plenum spaces 130, 134 respectively.

The below-freezing air from the inlet passageway 108 even as tempered by the above described motor fan cooling action, still has a reduced temperature in the order of 25–30° F. as it enters plenum spaces 130, 134 so that a direct convective heat transfer relationship between the circulated air and the rear liner wall 102 of the high humidity compartment 90 in the region of the inlet plenum 130, 134 can produce a substantial frost accummulation of the inside surface of the rear liner wall 102. Accordingly, as seen in FIGURE 4, between each of the plenums 130, 134 and the rear liner wall 102 is located a sideways extending strip 156 of the member 120 of thermal insulating material that shields the upper edge of the rear wall 102 from the circulating air as it is passed from the inlet passageway 108.

It has been found that to produce cooling of the compartment 90 into a temperature range of 34° F. to 38° F. in the illustrated working embodiment, the fan motor 86 is rated at 16 watts and the fan 76 at operating speed produces a flow rate of cooling air through duct 108 of 8 to 10 cubic feet per minute. To thermally insulate the rear wall 102 from the sub-freezing inlet air, the insulation 120 has a K factor of .24 B.t.u. $hr.^{-1}$ $ft.^{-2}$ ° $F.^{-1}$ per inch. To avoid frost build-up on the inside surface bounding compartment 90, the insulation 120 is 3/16 inch thick through its vertical reach and 7/16 inch thick at side reaches 156.

The air flow through the inlet plenums 130, 134 primarily is directed into heat transfer relationship with the outside surface of side walls 98, 100 with only a small portion of the circulating below-freezing air being allowed to circulate downwardly across the rear wall 102. Accordingly, the rear duct member 112 is deformed inwardly toward wall 102 at 158 on either side thereof to form corner ridges that engage the rear liner wall 102 as best seen in FIGURES 4 and 6 at the corners formed by the side wall 98 and rear wall 102 and the side wall 100, and rear wall 102 respectively. Additionally, the rear duct member 112 is also deformed inwardly toward wall 102 at 160 on either side of the flow divider member 116 and into engagement with the rear wall 102 whereby a small flow metering passageway 162 is formed between the deformed portions 158, 160 so that fluid flow from the inlet plenums 130, 134 across the outer surface of the rear wall of the liner represents only a small fraction of the total volume of cooling air being circulated by the fan 76 but is sufficient to reduce the temperature of the rear wall 102 to a point slightly above 32° F.

Figure 8:
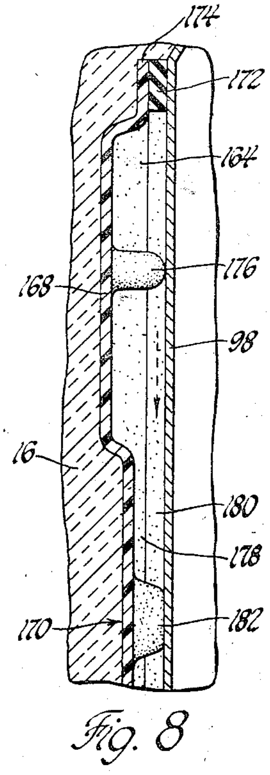
FIGURE 8 is an enlarged vertical sectional view along the line 8—8 of FIGURE 4.
Figure 9:
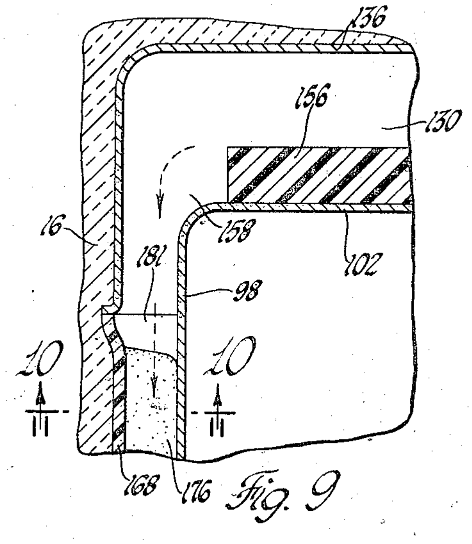
FIGURE 9 is an enlarged fragmentary sectional view of area 9 in FIGURE 4.
Figure 10:
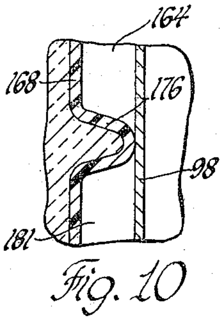
FIGURE 10 is a vertical sectional view along 10—10 of FIGURE 9.

The greatest portion of the divided air flow into each of the inlet plenums 130, 134 is directed around each corner at the rear of the inner liner 97 of the compartment 90 into forwardly directed side passageways 164, 166. The side passageway 164, as shown in FIGURE 8, is defined by an outwardly deformed portion 168 at the top of a side duct member 170 and a peripheral side gasket member 172 that is disposed between the upper edge of the side wall 98 of the inner duct and an upwardly directed edge flange 174 on the side duct member 170 in sealing engagement therewith. A flow directing flange 176 formed on the outwardly directed portion 168 extends across substantially the full width of the bent portion 168 and in engagement with wall 98, as best seen in FIGURES 4 and 8, thereby causing air from the inlet plenum 130, as it is passed around the corner of the inner liner, to continue to the front edge of the liner side wall 98 and thence to pass through a reduced space 178 at the forwardly located end of the flange 176 and thereafter through a thin sheet-like cooling air passageway 180 formed between the side member 170 and the side wall 98 as best seen in FIGURES 1 and 6.

The air from the inlet plenum 130 likewise is in part distributed through a space 181 at the opposite end of the directing flange 176 for subsequent downward flow through the air cooling passageway 180.

It is important to note that the air cooling space 180 has a narrow, elongated rectangular cross-section extending across the full planar extent of the outer surface of the side wall 98 at the compartment 90. The reduced width of the space 180 results in a substantial velocity in the air flow across the outer surface of liner 97 producing a good heat transfer coefficient between the side wall 98 and the cooling air believed in part to be due to a fluid scrubbing action resulting from the reduced width of the flow passageway. At the above mentioned flow rates and temperatures to obtain cooling of the side wall 98 at 32° F. in the preferred form, the flow cross-section through passageway 180 is reduced by one-half that of the downward flow cross-section at space 164.

In order to retain the reduced width necessary to produce the above described good heat transfer scrubbing action of the cooling fluid with side wall 98 the side duct member 170 includes a plurality of inwardly directed buttons 182 thereon which space the duct member 170 from the inner wall 98 and prevent any undesirable buckling of the substantial planar extent of the side member 170 that might tend to result from the pressure of foamed in place insulating material that is present in the section of the side wall 16.

The passageway 166 on the opposite side of the refrigerator is formed by a side duct member 184 that is a mirror image of the duct member 170 and formed to a shape that cooperates with the side wall member 100 in a fashion identical to the previously discussed duct member 170 to form a space 186 therebetween like passageway 180.

Figure 3:
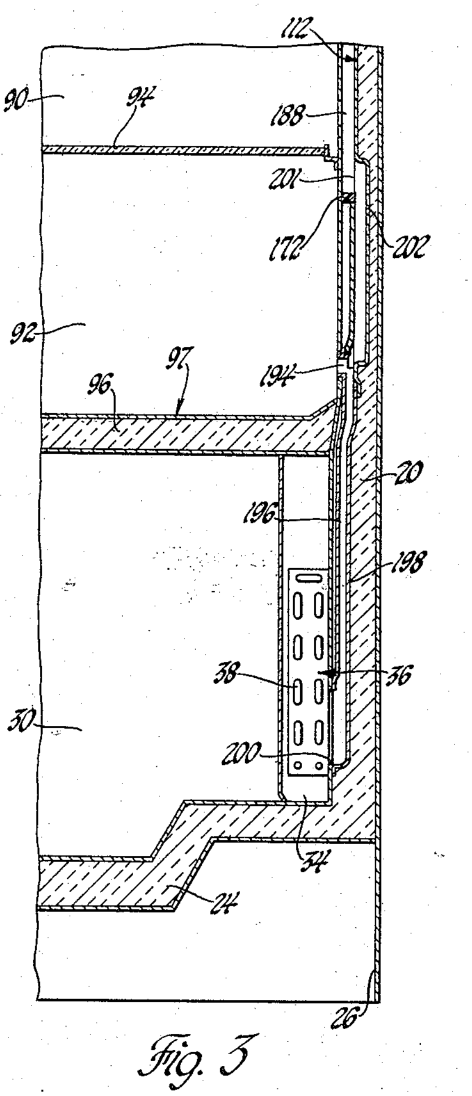
FIGURE 3 is a fragmentary view in vertical section taken along the line 3—3 of FIGURE 1.
Figure 11:
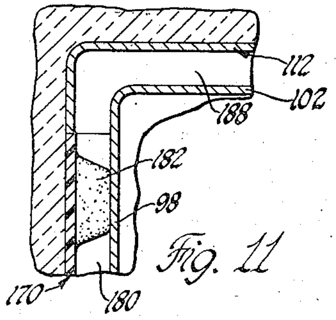
FIGURE 11 is an enlarged fragmentary sectional view of area 11 in FIGURE 5.
Figure 13:
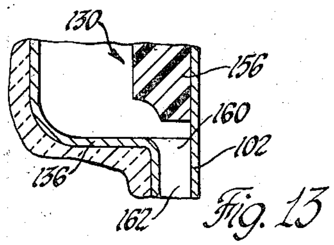
FIGURE 13 is an enlarged vertical sectional view along line 13—13 of FIGURE 6.

As seen in FIGURES 5 and 11, the side passageways, 180, 186 are in direct communication with a rear space 188 between the rear duct 112 and the rear wall 102 of the inner liner. Also, the side space 186 is communicated by an opening 190 in the side wall 100 at a point below shelf 94 that divides the high humidity compartment 90 from the flowing cold compartment 92. The opening 190 is sized to proportion the predetermined flow of cooling air into and through the flowing cold compartment 92 for discharge through an outlet opening 194 that, as is best seen in FIGURE 3, communicates with a return passageway 196 formed by a return duct 198 communicating through previously described return 109 with an inlet opening 200 into the base of the compartment 58 of the cooling space 34 in which is located the widely spaced fin members 40 of the evaporator 36. The flow of coolant through flowing cold compartment 92 is shown with solid line arrows and is sufficient under equilibrium conditions to maintain a temperature therein of about 34° F. The forced draft through the compartment 92 is an effective method for cooling bottled articles and other articles which are sealed against dehydration.

The opening 190 is proportioned to cause a part of the predetermined volume of air circulating through the side passageways 180, 186 to return around the rear corners of the liner 97 and pass through the rear space 188 along with the small amount of air bled through the metering passageways 162 into a by-pass passageway 201 formed in part by a depending rear duct 202 that overlaps the lower edge of the rear liner 112 as best seen in FIGURE 3. The by-pass passageway 201 in turn connects with the return passageway 196 formed by the diagonally directed duct member 198 that is in communication with the return opening 194 from the flowing cold compartment 132 at one end thereof and is opened at the opposite end thereof to communicate the passageway 88 with the evaporator compartment 58. The above discussed pattern of by-passed, heat laden cooling air is shown in double-lined, dotted arrows in FIGURE 1 and the final return stream is shown in triple-lined dotted arrows.

Another feature of the present invention is that cooling air passing through the side passageway 186 upon entering the rear passageway 118 will mix with the small amount of subfreezing air from the plenum 134 through orifice 162 and will pass downwardly across the rear wall 102 of the inner liner toward the bottom of the high humidity compartment 90. This warms the cooling air stream a predetermined extent sufficient to prevent undesirable frost build-up in the vicinity of the divider shelf 94. Furthermore, this above described fluid stream is blocked by a bottom part of the peripheral sealing gasket 172 and is directed thereby laterally across the rear wall 102 through a cross-over passageway 204 formed below insulation member 120 between walls 102, 112, as best seen in FIGURES 1 and 2. This lateral air flow serves to thermally insulate the subfreezing air flow through the inlet passageway 108 from the rear wall 102 of the high humidity compartment 90 as does the polystyrene layer 120. In the illustrated embodiment, a small electrically energized heater 192 is included in passageway 204 to prevent frost build-up under extreme operating conditions. Furthermore, the lateral relief of passageway 204 allows for a balanced air flow through the side passageway 190 from the side passage 186 into compartment 92 thereby to produce desired cooling within both the high humidity compartment 90 and the flowing cold compartment 92.

Figure 14:
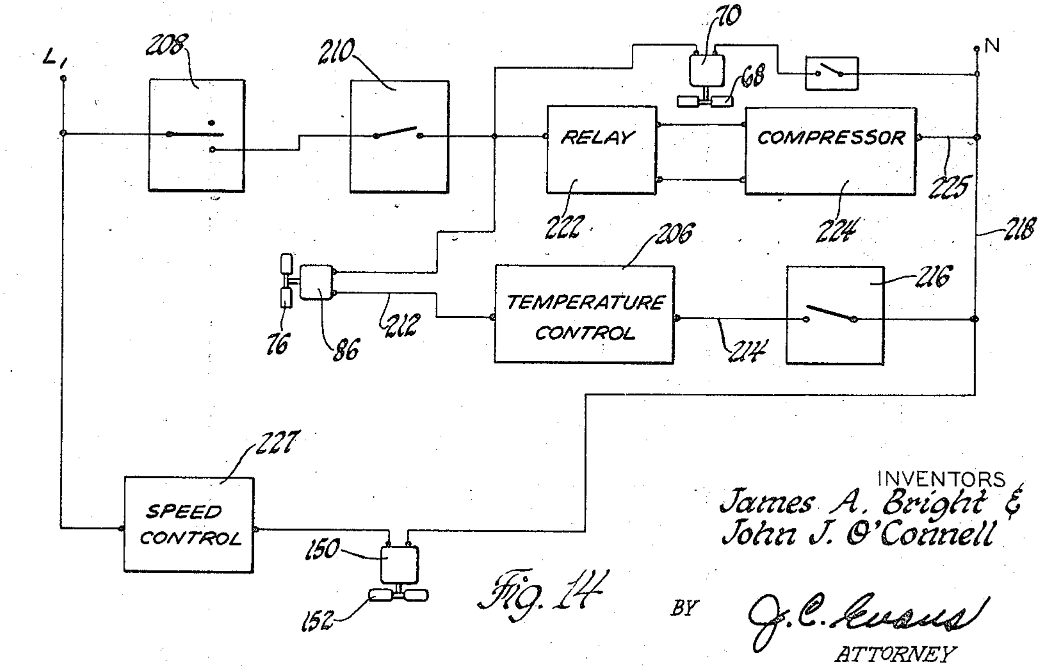
FIGURE 14 is an electrical wiring diagram for controlling the operation of the refrigerating apparatus of the present invention.

In accordance with certain other principles of the present invention, the 16 watt food compartment fan motor 86 is controlled at variable speeds by a temperature responsive, solid state phase controller 206 of the type set forth in copending United States application Ser. No. 519,400, filed Jan. 3, 1966, to James A. Canter. As seen in FIGURE 14, the controller 206 is connected in a fan motor energization circuit from wire $L_1$ through a defrost timer switch 208 thence through unit thermostat 210 to the food compartment fan motor 86 which is connected by conductor 212 to the solid state temperature controller 206 which in turn is electrically connected by a conductor 214 to a fan switch 216 that is operated closed upon movement of the refrigerator door into a closed position. From switch 216, the circuit passes through a conductor 218 thence to wire N. As is more specifically set forth in the copending Canter application, the phase control 206 includes thermal sensing means such as a thermistor, which in this embodiment of the invention, senses the temperature in compartment 92 to control the power input to the motor 86 so as to continuously vary the speed of operation of the fan 76 directly in accordance with temperature changes within the flowing cold compartment 92 to control the temperature in both compartments 90, 92. The controller 206 responds to the slightest change in the temperature within compartment 92 and immediately adjusts the speed of the fan to deliver the amount of cold air necessary to maintain a 34–38° F. range in compartment 90 and a 34° F. temperature in compartment 92. The sensitivity of the controller 206 is set so that a temperature change of only a half degree from a control temperature will change the speed of fan 76 from almost zero to full speed. This assures a quick, automatic increase in air flow through the aforedescribed improved distribution system when warm foods are placed in the refrigerator. Furthermore, the speed will continually change to compensate for thermal transfer through the insulated walls of the unit.

The control circuit of FIGURE 14 also includes a compressor motor energization circuit that runs from wire $L_1$ to defrost timer 208 thence through thermostat 210 that controls energization of the compressor motor in accordance with a predetermined temperature in the freezer. The unit thermostat 210 is in turn electrically connected through a starting and overload relay 222 to one side of the compressor motor 224 which has the opposite side thereof connected by conductor 225 to wire N. The thermostat 210 also controls energization of freezer fan motor 70.

By virtue of the infinite speed control of the food compartment fan 86, the air circulating cooling air stream is readily adjusted to compensate for variations in the amount of cooling requirement in each of the high humidity and flowing cold compartments whereby the system is quickly returned to a predetermined desired temperature range, for example, wherein the high humidity compartment is maintained from 34 to 38° F. and the flowing cold compartment is maintained in the range of 34° F. Compensation for thermal load changes moreover occur without any appreciable reduction in the temperature of the walls of the inner liner 97 of the high humidity compartment 90 that might cause an undesirable build-up of frost on the inner surface thereof.

The high humidity compartment 90 further includes a moisture control system 226 which utilizes a speed controller 227 to supply power to motor 150 of the upper compartment fan 152 to produce a unique fluid circulation pattern within the compartment 90 so as to reduce moisture build-up on shelves within the compartment 90 that might result in undesirable dripping problems or the like. The humidity control system 226 in part includes a moisture collection and drainage system 228 that directs condensate to a pan 230 located in heat transfer relationship with the condenser 48 for evaporating such condensate. The humidity control system 226 and drainage system 228 are more specifically set forth in copending United States application Ser. No. 606,602, filed Jan. 3, 1967 by Bright et al.

While the embodiment of the present invention as herein disclosed constitutes a preferred form it is to be understood that other forms might be adopted.

What is claimed is as follows:

1. In a domestic frost-free refrigerator for preserving fresh foods for an extended period of time without forced draft dehydration, the combination of an insulated cabinet, means including a liner within said insulated cabinet forming a sealed food storage compartment, refrigerating means for circulating a cold, dry stream of sub-freezing air at a predetermined flow rate between said insulated cabinet and the outer surface of said liner, duct means including an inlet portion for directing the sub-freezing air stream to the outer surface of the liner and a return portion for returning air from the liner, thermal insulating means located between said inlet portion of said duct means and said liner for maintaining a predetermined temperature differential between said air stream and said liner whereby the liner is maintained at a temperature slightly above freezing, said air stream flowing through said inlet portion having the temperature thereof tempered by heat flow from said compartment, said duct means including an intermediate duct portion interconnecting said inlet portion and said return portion overlying said liner and being enclosed to cause said tempered air stream to pass in direct convective heat transfer relationship with the liner, said tempered air stream as it passes through said intermediate duct portion flowing at a predetermined rate to maintain said liner at a temperature slightly above freezing to prevent frost deposition on the inner surface thereof.

2. In a domestic frost-free refrigerator assembly the combination of refigerating means, a liner defining a food storage compartment including spaced apart side walls, a rear wall, a top and a bottom, a divider shelf joining said side walls and rear wall between the top and bottom of said food storage compartment for dividing said compartment into first and second sections, first duct means located in spaced relationship with the upper ends of said side walls and said back to form a first flow chamber around said upper ends, inlet means connected to said refrigerating means for directing a stream of sub-freezing air from said refrigerating means into said first flow chamber at the back of said liner between said side walls, means for dividing said inlet flow into first and second parts each flowing through said first chamber toward one of said side walls, second duct means located in spaced relationship with said side walls and back to form a cooling passageway across said sides and back below said first chamber, thermal insulating means disposed between said sub-freezing inlet air means and said back wall of said liner for maintaining a temperature differential between the back wall and said sub-freezing inlet air that produces a back wall temperature above freezing, air flow from said first fluid chamber having the temperature thereof tempered by heat flow from said food storage compartment, means for proportionally flowing said tempered air from said first fluid chamber into said cooling passageway and downwardly across said back and side walls at a rate to maintain the side and back walls throughout the planar extent of said overlying second duct means slightly above freezing, said air cooled portions of said side and back walls cooling one of said compartment sections, means forming an inlet to the other of said sections of said food compartment, means forming an outlet therefrom, means forming an outlet from said second duct means communicating with the inlet to said other food compartment section for directing air from the liner following cooling of the walls surrounding said first section through the other section of the compartment, return means communicating the outlet of said other section with said refrigerating means, and means for by-passing a predetermined part of the fluid flow through said cooling passageway formed by said second duct means directly to the return means.

3. In a domestic frost-free refrigerator, the combination of means forming a lower freezer compartment, means for cooling said freezer compartment including an evaporator located next to said compartment, means forming a food storage compartment above said lower freezer compartment, means including a vertically directed supply duct for circulating air at a predetermined rate from said evaporator toward said upper compartment, said upper compartment including a liner having spaced apart side walls, a rear wall, a top and a bottom, said vertically directed duct located rearwardly of said back and extending to the top of said liner, thermal insulating means disposed between said supply duct and said back to said liner for maintaining a temperature differential between air flow through said supply duct and said back so said back will be above freezing, a first duct member enclosing an upper portion of the back and sides of said liner at a first predetermined spaced relationship forming an inlet chamber with a downward flow path across said side walls having a first cross-sectional flow area, means for dividing the air stream through said supply duct into separate air streams passing in opposite directions through said inlet chamber across said back and around said side walls, a second duct member below said first duct member located in closer spaced relationship between said sides and back and forming a second downward flow passageway across said sides and back having a lesser cross-sectional area than the flow passageway downwardly through the first chamber for producing a velocity increase in the air flow downwardly across each of said side walls and back thereby to produce an improved heat transfer coefficient at the interface between the air stream and the outer surface of the liner, said second passageway communicating with said inlet chamber and extending downwardly across the outer surface of the side and back walls of the compartment liner to cool the upper compartment, and means for returning the cooling air from said liner to said evaporator.

4. In a domestic frost-free refrigerator, the combination of means forming a lower freezer compartment, means for cooling said freezer compartment including an evaporator located next to said compartment, means forming a food storage compartment above said lower freezer compartment, means including a vertically directed supply duct for circulating air at a predetermined rate from said evaporator toward said upper compartment, said upper compartment including a liner having spaced apart side walls, a rear wall, a top and a bottom, said vertically directed duct located rearwardly of said back and extending to the top of said liner, thermal insulating means disposed between said supply duct and said back to said liner for maintaining a temperature differential between air flow through said supply duct and said back so said back will be above freezing, a first duct member enclosing an upper portion of the back and sides of said liner at a first predetermined spaced relationship forming an inlet chamber with a downward flow path across said side walls having a first cross-sectional flow area, means for dividing the air stream through said supply duct into separate air streams passing in opposite directions through said inlet chamber across said back and around said side walls, a second duct member below said first duct member located in closer spaced relationship between said sides and back and forming a second downward flow passageway having a lesser cross-sectional area than the flow passageway downwardly through the first chamber for producing a velocity increase in the air flow downwardly across each of said side walls thereby to produce an improved heat transfer co-efficient at the interface between the air stream and the outer surface of the side walls, said second duct extending downwardly across an upper part of the side and back walls of the compartment liner and the air flow through said cooling passageways formed thereby serving to cool an upper part of the compartment bounded by said air cooled liner walls, a divider member within said compartment for separating said upper section and a lower section, means for directing a part of the air flow through said second cooling passageway directly through said lower compartment section for cooling articles therein by direct convective heat transfer contact therewith, means for by-passing a second part of the air flow through said second cooling passageway around said other compartment section and returning the second part back to the evaporator, means forming a passageway transverse to said supply duct and between said supply duct and said back wall of said liner for returning air from one of the side walls to the by-pass means and to form a barrier between said supply duct and said back to maintain the back above freezing whereby moisture within said upper food compartment section is able to condense on said side and rear walls without producing a frost layer thereon.

5. In a domestic frost free refrigerator, the combination of means forming a freezer compartment, means forming a cooling space adjacent said freezing compartment, a single evaporator located in said cooling space, first duct means forming a first closed air circuit in part formed by said freezing compartment, means for circulating air through said freezing compartment and across part of said single evaporator for maintaining a temperature in said freezing compartment below freezing, a liner defining an above freezing food storage compartment, means for cooling said above freezing compartment including second duct means forming a second closed air flow circuit, fluid circulating means for directing air across a second portion of said single evaporator out of fluid communication with said first portion thence through said second duct means at a predetermined rate, said second duct means including a portion thereof in direct heat transfer relationship with the outer surface of said liner for cooling said liner and the compartment defined thereby, said fluid circulating means including an electrically energizable drive motor, a fan driven by said motor, control means for modulating current flow to said drive motor to vary the speed of operation of said fan for varying the rate of air flow passing through said second closed circuit, and means responsive to the temperature of said above freezing compartment for conditioning said control means to vary the energization of said drive motor in accordance with the temperature of said above freezing compartment whereby said fan means is operative to reduce the rate of air flow directly in proportion to temperature variations in said above freezing compartment.

6. A method for cooling a domestic refrigerator compartment without forced draft dehydration of articles therein and without the formation of frost within the compartment comprising circulating air at a predetermined flow rate across a cold source for reducing the temperature of the air stream below freezing, passing the sub-freezing air stream to the outer surface of a sealed liner forming the compartment, distributing the sub-freezing air across the outer surface of the compartment liner, initially thermally insulating the sub-freezing flow from the liner to maintain a temperature differential between the liner and sub-freezing air for producing slightly above freezing liner temperatures through the part of the liner that is insulated, tempering the subfreezing air stream, diverting the tempered air stream into direct convective heat transfer relationship with the outer surface of the liner for cooling that part of the liner slightly above freezing, and returning the air stream from the liner to flow across the cold source.

7. A method for maintaining a high humidity in a frost proof refrigerator including a vertically oriented liner defining a sealed compartment with a back and side walls comprising the steps of circulating air at a predetermined flow rate across a cold source for producing a sub-freezing air stream, directing the sub-freezing air stream through a first flow path from the lower end to the upper end of the vertically oriented back wall, thermally insulating the air in the first flow path from the back wall to maintain a temperature differential between the air stream and the liner so that liner will be above freezing across the first flow path, tempering the air stream by heat transfer from the compartment into the air stream through the first flow path, returning the tempered air stream through a second flow path from the upper end of the vertically oriented back and side walls from the upper end to the lower end thereof and in direct convective heat transfer relationship therewith, said tempered air stream having a temperature and flow rate through said second flow path to maintain the liner above freezing throughout the part of the liner in heat transfer relationship with the second flow path, and returning the tempered air stream from the second liner section for recooling by the cold source.

8. A method for cooling a plural compartment refrigerator including a sealed high humidity compartment and a flowing cold compartment comprising the steps of passing air at a predetermined flow rate across a cold source for cooling the air below freezing, directing the sub-freezing air across a first portion of the outer surface of the liner of the high humidity compartment while insulating the sub-freezing air from the liner until the sub-freezing air is tempered a predetermined degree, returning the tempered air stream across another outer surface portion of the liner of said high humidity compartment in direct convective heat transfer relationship therewith, dividing the returned air flow into a first part and a second part, passing the first part through the flowing cold compartment, by-passing the second divided part about the flowing cold compartment in cross-flow relationship with the circulating sub-freezing air stream at a point between the sub-freezing air stream and the liner to insulate the liner from the circulating sub-freezing air stream.

References Cited

UNITED STATES PATENTS

| | | | |
|---|---|---|---|
| 2,175,498 | 10/1939 | Wilnau | 62—405 |
| 2,285,945 | 6/1942 | Rundell | 62—405 |
| 2,289,662 | 7/1942 | Lindgren | 62—405 |
| 2,467,427 | 4/1949 | Green | 62—405 |
| 2,476,123 | 7/1949 | Tobey | 62—405 |
| 2,576,665 | 11/1951 | Bixler | 62—405 |
| 2,589,551 | 3/1952 | Iwashita | 62—405 |
| 2,866,323 | 12/1958 | Candor | 62—419 X |

WILLIAM J. WYE, *Primary Examiner.*